United States Patent
Garnier et al.

(10) Patent No.: US 11,788,931 B2
(45) Date of Patent: Oct. 17, 2023

(54) METHOD FOR MONITORING THE TORSION OF A ROTARY SHAFT ON A TURBOMACHINE OF AN AIRCRAFT

(71) Applicant: SAFRAN AIRCRAFT ENGINES, Paris (FR)

(72) Inventors: Alméric Pierre Louis Garnier, Moissy-Cramayel (FR); Marion Cuny, Moissy-Cramayel (FR); Tony Alain Roger Joël Lhommeau, Moissy-Cramayel (FR); Claire Marie Figeureu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/755,984

(22) PCT Filed: Nov. 13, 2020

(86) PCT No.: PCT/FR2020/052075
§ 371 (c)(1),
(2) Date: May 13, 2022

(87) PCT Pub. No.: WO2021/094693
PCT Pub. Date: May 20, 2021

(65) Prior Publication Data
US 2022/0390328 A1 Dec. 8, 2022

(30) Foreign Application Priority Data
Nov. 14, 2019 (FR) ...................................... 1912727

(51) Int. Cl.
*G01M 15/14* (2006.01)
*F01D 21/00* (2006.01)
*G01L 3/10* (2006.01)

(52) U.S. Cl.
CPC ........... *G01M 15/14* (2013.01); *F01D 21/003* (2013.01); *G01L 3/109* (2013.01); *F05D 2220/323* (2013.01); *F05D 2260/83* (2013.01)

(58) Field of Classification Search
CPC ...... G01M 15/14; G01L 3/109; F01D 21/003; F05D 2220/323; F05D 2260/83
See application file for complete search history.

(56) References Cited

U.S. PATENT DOCUMENTS

| 4,520,681 A | * | 6/1985 | Moore ..................... G01L 3/242 73/862.28 |
| 5,067,355 A | * | 11/1991 | Witte ........................ G01L 5/26 73/112.01 |

(Continued)

FOREIGN PATENT DOCUMENTS

| EP | 1980719 A2 | 10/2008 |
| EP | 2893158 B1 | 11/2016 |

(Continued)

OTHER PUBLICATIONS

French Search Report issued in French Application No. 1912727 dated Jul. 15, 2020 (7 pages).

(Continued)

*Primary Examiner* — Eric S. McCall
(74) *Attorney, Agent, or Firm* — Bookoff McAndrews, PLLC

(57) ABSTRACT

A method for monitoring the torsion of a rotary shaft on an aircraft turbomachine based on the measurements from at least three sensors distributed along the rotary shaft to divide the shaft into at least two shaft segments, the method comprising:
a step of measuring, for each sensor, a parameter dependent on the rotation of the shaft,
a step of calculating, for each achievable pair of sensors, a parameter related to the torsion of the shaft, (Continued)

a step of comparing the different calculated parameters related to the torsion of the shaft with references,
a step of detecting damage on a shaft segment at the end of the comparison step, and
a step of indicating the localization of the damage on the shaft from the shaft segment for which damage has been detected.

9 Claims, 6 Drawing Sheets

(56) References Cited

U.S. PATENT DOCUMENTS

| | | | | |
|---|---|---|---|---|
| 6,745,621 | B1* | 6/2004 | Le Roux Cilliers | G01L 3/109 |
| | | | | 73/114.26 |
| 2008/0156972 | A1* | 7/2008 | Vahabzadeh | G01L 3/12 |
| | | | | 250/231.13 |
| 2008/0319684 | A1* | 12/2008 | Parrish | G01L 3/109 |
| | | | | 702/43 |
| 2012/0041691 | A1* | 2/2012 | Fericean | G01L 3/105 |
| | | | | 702/41 |
| 2017/0370805 | A1* | 12/2017 | Habens | G01M 15/12 |
| 2018/0051587 | A1* | 2/2018 | Fletcher | F02C 3/00 |
| 2018/0209503 | A1* | 7/2018 | Weilenmann | F16H 33/08 |
| 2019/0025142 | A1* | 1/2019 | Renault | G01L 3/109 |
| 2022/0055609 | A1* | 2/2022 | Mizuguchi | B60K 6/387 |
| 2022/0228934 | A1* | 7/2022 | Kakaley | G01L 3/104 |
| 2022/0403752 | A1* | 12/2022 | Garnier | G01M 5/0033 |
| 2023/0016039 | A1* | 1/2023 | Abboud | G01M 15/14 |

FOREIGN PATENT DOCUMENTS

| | | |
|---|---|---|
| FR | 2995018 A1 | 3/2014 |
| FR | 3071919 A1 | 4/2019 |

OTHER PUBLICATIONS

International Search Report issued in International Application No. PCT/FR2020/052075 dated Apr. 14, 2021 (13 pages).

* cited by examiner

[Fig. 1]
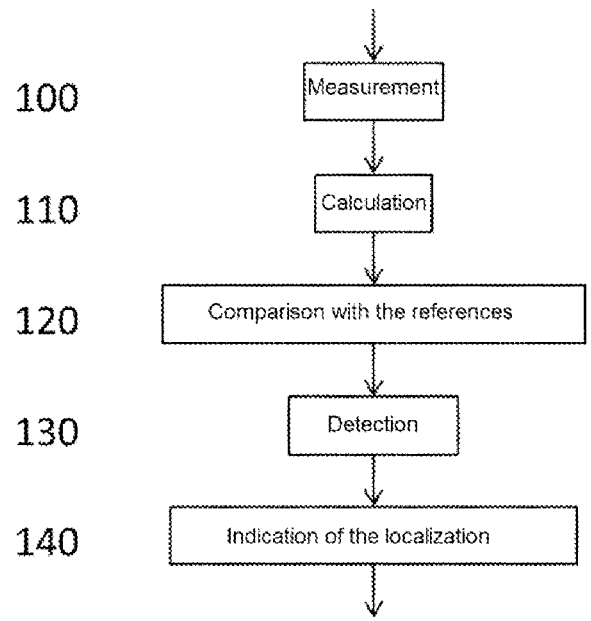
[Fig.2]
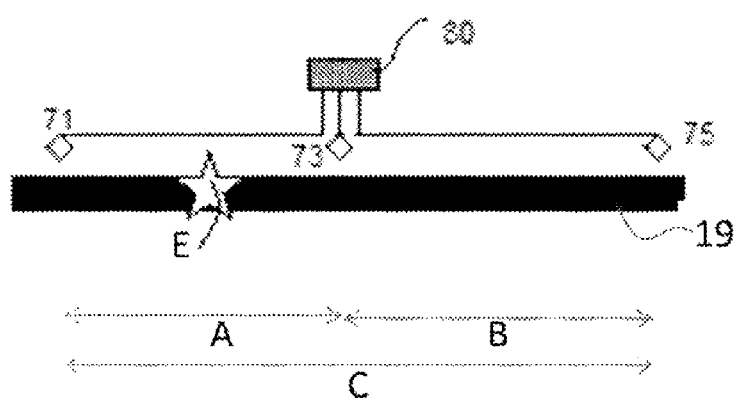

[Fig.3]
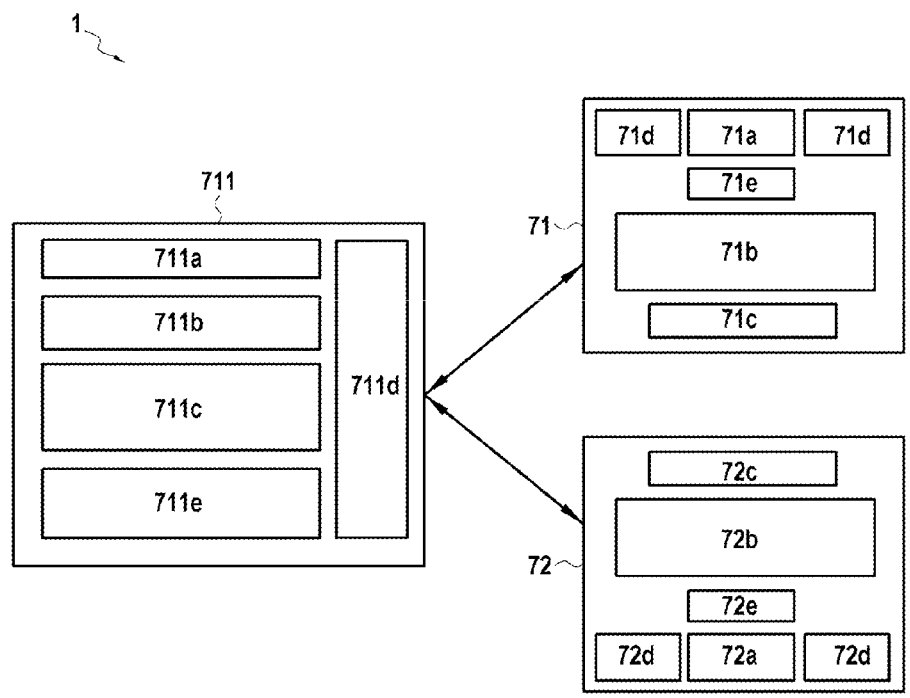
[Fig. 4]
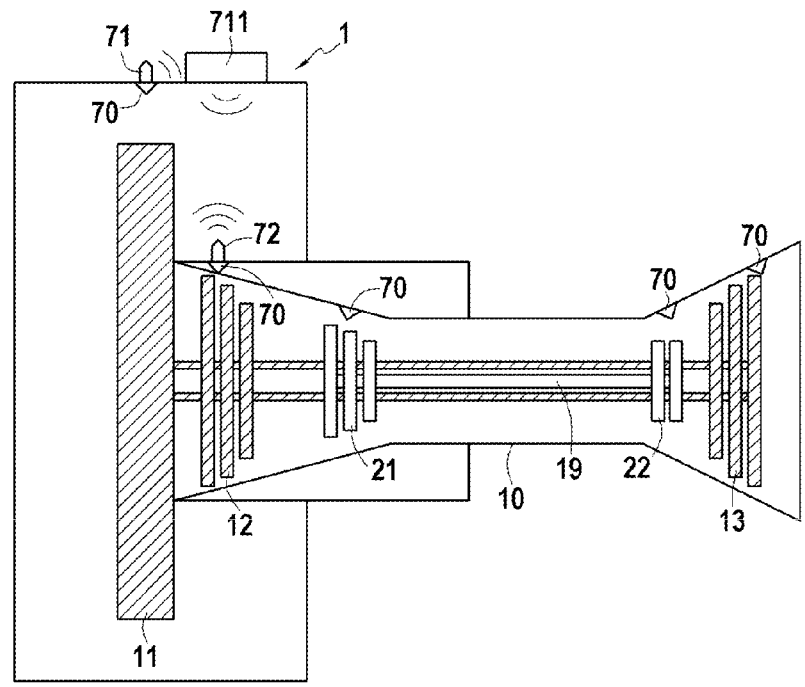

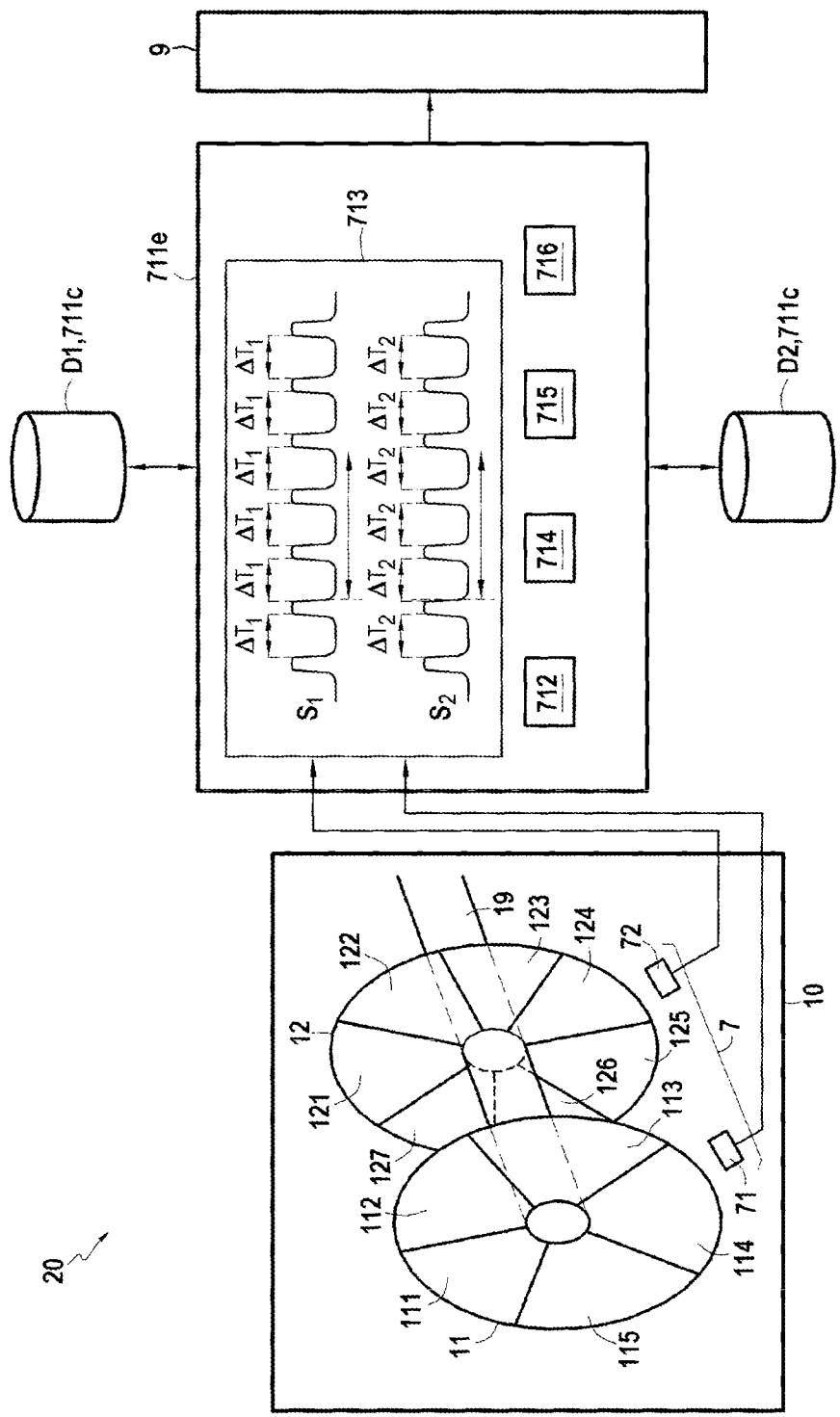
[Fig. 5]

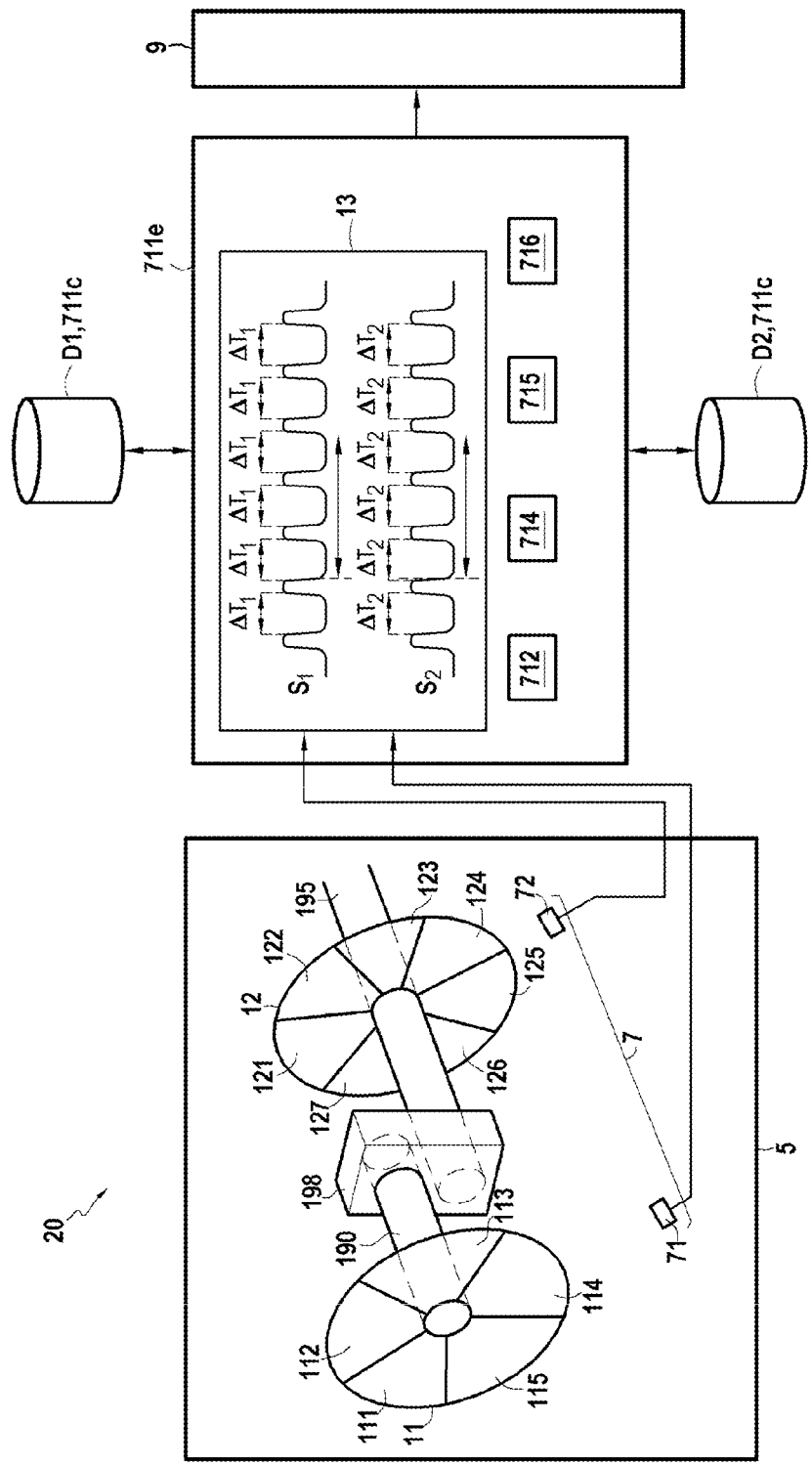
[Fig. 6]

[Fig. 7]
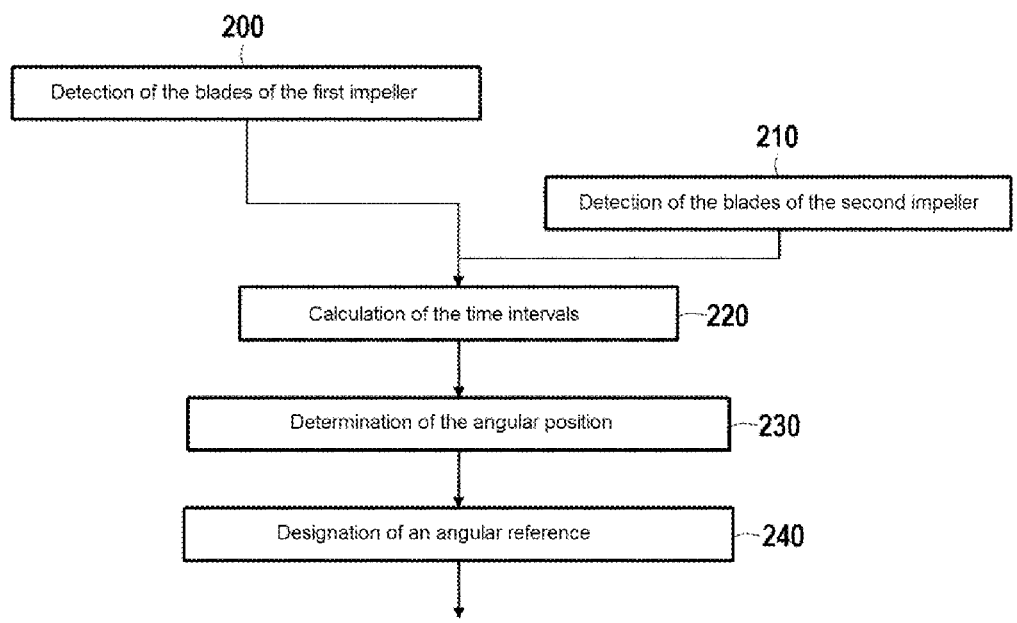

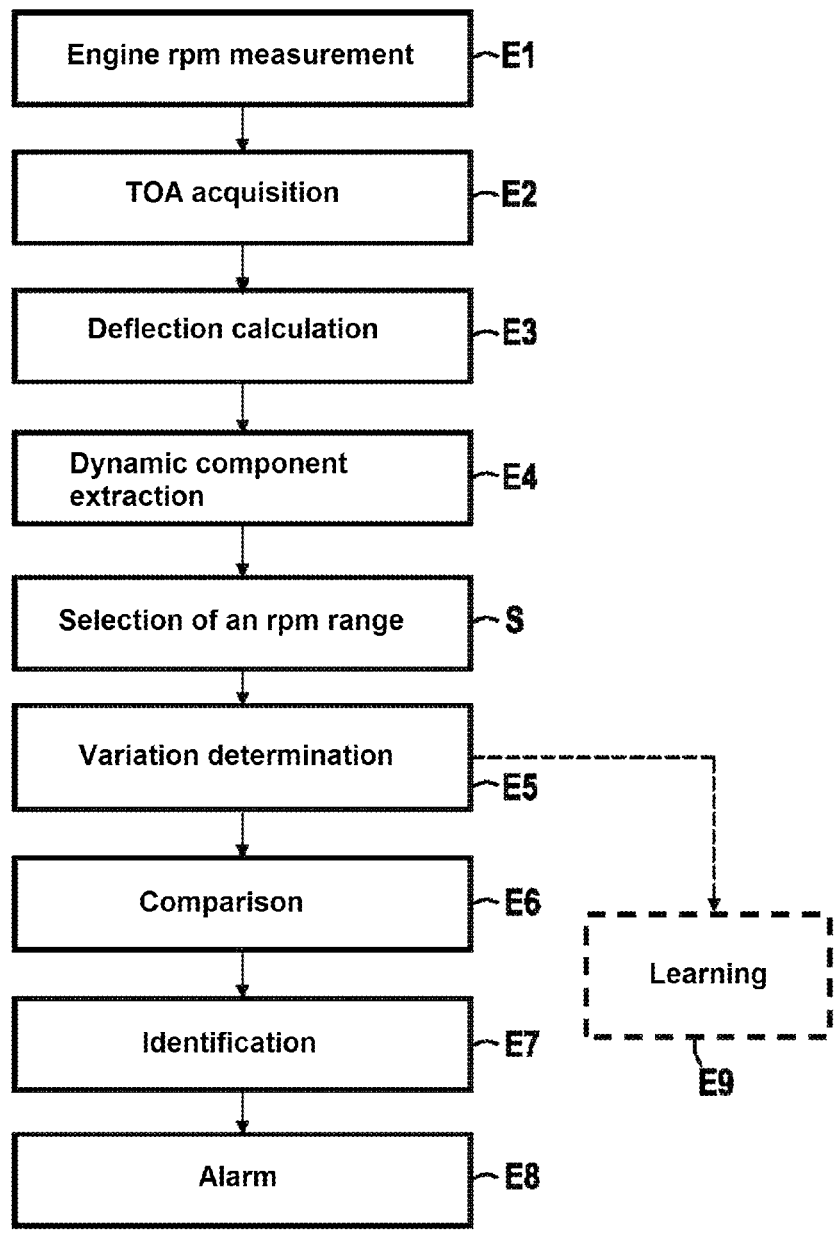
[Fig. 8]

METHOD FOR MONITORING THE TORSION OF A ROTARY SHAFT ON A TURBOMACHINE OF AN AIRCRAFT

CROSS-REFERENCE TO RELATED APPLICATION(S)

This patent application is a National Stage Application of International Application No. PCT/FR2020/052075, filed on Nov. 13, 2020, which claims priority to French Patent Application No. 1912727, filed on Nov. 14, 2019.

TECHNICAL FIELD

The invention relates to the field of the monitoring an aircraft engine and more particularly the monitoring of the torsion of a rotary shaft on an aircraft turbomachine with a localization of any damage on this shaft.

PRIOR ART

The monitoring of the torsion of a rotary shaft of an aircraft is conventionally carried out using one or two sensors. A first sensor is mounted in the vicinity of the low-pressure compressor of the turbomachine or in the vicinity of the fan, and a second sensor, coupled to the first one, is mounted in the vicinity of the low-pressure turbine.

However, when a torsion monitoring is carried out from only two sensors, the shaft torsion monitoring is feasible, but not the localization of the drift (i.e. identifying which shaft segment is drifting relative to what is expected) although the influence of the anomaly propagates over the entire shaft. The monitoring of the shaft then corresponds to a global monitoring of the torsional behavior of the rotary shaft, in this case the low-pressure shaft. This monitoring is often specific to testing needs.

A method is known for controlling the torque oscillations in a mechanical transmission chain of an electrical generation system providing electrical energy to an isolated electrical network, the method comprising a step of monitoring changes in the electrical state of the electrical network.

There is also known a method and apparatus for monitoring the rotational speed of a shaft, particularly a shaft having a number of elements spaced apart or rotating with the shaft, the monitoring being carried out using instrumentation for measuring the speed of a shaft via the use of a phonic wheel.

These two methods use specific instrumentation, of the torsion meter type, for measuring the current change as a function of the torque of the shaft, or of the phonic wheel type, which makes it necessary to embed on the turbomachine specific sensors or elements dedicated solely to that use. This leads to additional bulk and additional mass on the turbomachine solely for this purpose.

A gas turbine is also known comprising a fan section comprising a fan rotatable with a fan shaft, a turbomachine section comprising a turbine and a turbomachine shaft rotatable with the turbine, a power gearbox mechanically coupled to the fan shaft as well as to the turbomachine shaft so that the fan shaft can rotate through the gearbox, comprising a gear. The turbomachine further comprises a torque monitoring system comprising a gearbox sensor and a shaft sensor, the gearbox sensor being actuatable with the power transmission gear, the shaft sensor being actuatable with at least one of the shafts of the turbomachine or of the fan, the torque monitoring system determining an angular position of the gear of the gearbox relative to at least one of the shafts of the turbomachine or of the fan by using the gearbox sensor and the shaft sensor to determine a torque in the gas turbine engine.

This method uses two sensors of the angular position of the gear, only one of the two, typically a revolution counter sensor, being positioned on the shaft, upstream or downstream of the power gearbox, to give the angular position of the shaft. The variation in the position difference is related to the torque and only allows determining whether there is damage on the shaft but not localizing a specific segment of the shaft on which the damage is located.

There is also known a controller for a gas turbine engine configured to measure a first rotational speed of an engine shaft at a first end of the shaft and to measure a second rotational speed of the shaft at a second end. The first end can be coupled to a turbine of the engine and the second end can be coupled to a compressor of the engine. The controller is further configured to determine a torsion angle of the shaft as a function of the first rotational speed and of the second rotational speed, to determine whether the torsion angle of the shaft is within a predetermined monitoring range for the state of health of the shaft and to record the torsion angle of the shaft.

The controller can be configured to generate a maintenance alert in response to the determination that the torsion angle of the shaft is within the predetermined monitoring range for the state of health of the shaft.

This known method uses two rotational speed sensors of the same shaft positioned at the two ends of the shaft. The comparison of the speeds allows monitoring torsion of the shaft, in particular on transient phases such as accelerations or decelerations. However, this method also uses sensors dedicated to this function only.

There is also known a method for detecting a shaft shear event comprising a step of storing in memory a shaft oscillation signature determined as a function of known characteristics of the shaft and associated with a shaft shear event, a step of monitoring a rotational speed of the shaft, a step of detecting from the rotational speed an oscillation wave superimposed on the rotational speed, the oscillation wave having a wave modulation frequency and a wave modulation amplitude, a step of comparing the oscillation signature with the oscillation wave, and a step of detecting the shaft shear event when the oscillation wave corresponds to the oscillation signature.

This method uses a specific technique for monitoring the oscillation waves.

There is also known from document EP 2893158, a turbomachine comprising at least one rotating axial shaft in a turbomachine casing, an annular reference portion including a long reference tooth and a short reference tooth, first means for detecting the passage of the two reference teeth and measuring the rotational speed of the shaft, an annular measuring portion comprising longitudinal measuring teeth, and second means for detecting the passage of the long reference tooth and of the measuring tooth to measure the shaft torque.

The monitoring method of this document uses two distinct rotational reference elements on the shaft to provide two angular references on the same shaft, which adds weight to the turbomachine for this monitoring.

DISCLOSURE OF THE INVENTION

The present invention aims to provide a method for monitoring the health of a shaft of a turbomachine from at least three sensors whose initial function is not to be tip-timing sensors or to monitor the shaft torsion.

To this end, the present invention proposes a method for monitoring the torsion of a rotary shaft on an aircraft turbomachine based on the measurements from at least three sensors distributed along the rotary shaft to divide the shaft into at least two shaft segments, the method comprising:

a step of measuring, for each sensor, a parameter dependent on the rotation of the shaft, a step of calculating, for each achievable pair of sensors, a parameter related to the torsion of the shaft, a step of comparing the different calculated parameters related to the torsion of the shaft with references, a step of detecting damage on a shaft segment at the end of the comparison step, and a step of indicating the localization of the damage on the shaft from the shaft segment for which damage has been detected.

The method according to the invention thus allows using a set of these sensors whose main function is not to measure the torsion of the shaft. Each sensor can thus be of a different nature and measure a physical signal of a different nature (radiative emission, capacitive, magnetic, resistive, fields etc.).

The method according to the invention thus allows extending the capacities for monitoring the health of the shaft of a turbomachine by operating a turbomachine equipped with at least three permanently mounted or modular sensors.

The method according to the invention thus allows having a situation with N sensors, distributed over several axial planes along the shaft, then dividing the shaft into N−1 discrete segments (space between two sensors). The combination of two measurements among the N allows generating a torsion monitoring of a shaft segment connecting a sensor of the first measurement with the sensor of the second measurement: namely the monitoring of 3 segments when there are 3 sensors. The method according to the invention thus offers the possibility of generating combinatorial monitoring actions of 2 among N segments when there are N sensors.

The sensors are configured to measure at least one parameter related to the rotation of the shaft to be able to trace the angular speed of the shaft. They can for example have a Tip-timing or rpm measurement functionality according to their main function, even if the latter is not the initial intended functionality.

Based on the data received by the sensors, two shaft monitoring actions can be conducted jointly among the following ones:

A monitoring of the static torsional behavior related to inertial loading of the shaft, as the turbine drives the compressor through the shaft. This monitoring can consist of a study of a drift in the static behavior expected on a segment, of a limitation of the allowed static torsion, of a control of the shaft following a bird ingestion or a loss of blade which leads to the generation of a rapid over-torque which can cause damage that will reduce the lifespan of the shaft, or of a detection of wear of the connecting elements between the different portions of the shaft (for example splines)

A monitoring of the dynamic behavior (oscillation around the static angular position) which can consist of an accumulation of time spent at a level of vibration for each segment, of a detection of a behavior drift, of a presence of two or more measuring planes that allow checking that the mode at the observed frequency is indeed a torsion mode.

Indeed at high frequency, it is not uncommon that several modes are observed at the same frequency. The multiplication of the planes allows filtering the modes which are not torsion modes and analyzing the actual amplitude of the torsion mode alone.

A monitoring of a reduction gear shaft consisting of tracking the torsion modes excited by the presence of a gear box (high-frequency mode, engine harmonics times the number of teeth of the gears), of a detection of wear of the gears, of a detection of the retrograde modes for which the sensors must be placed on either side of the gearbox.

These multiple monitoring actions on the multiple segments of a shaft are then transformed into a combination of health indicators that allows estimating the severity of the behavior drift and of the health (mechanical health of a shaft) degradation. These indicators are then compared with each other and aggregated to allow the lifting of the alert and after localization in the direction of the inspection and maintenance operators.

The method according to the invention thus allows distinguishing, with an optimized number of sensors and segmentations, higher-order vibration modes, as well as overcoming a possible presence of a node with regard to a sensor, and finally segmenting the monitoring by taking into account the presence of the possible reduction gears.

According to a first aspect of the method for monitoring the torsion of a rotary shaft, at least one of the sensors used to localize the damage can be a sensor permanently mounted on the turbomachine.

By using sensors already present on the turbomachine and dedicated to functions other than the function of monitoring the torsion of the shaft, the bulk and weight necessary for such monitoring are minimized.

According to a second aspect of the method for monitoring the torsion of a rotary shaft, the method can further comprise a preliminary step of installing at least one removable autonomous modular sensor, at least one of the sensors used to localize the damage being a modular, autonomous and removable sensor.

The use of a removable sensor thus allows occasionally adding a sensor on the turbomachine at a specific location so as to segment the monitoring of the shaft in a particular manner just the time to isolate and localize any damage on the shaft.

In another object of the invention, there is proposed an assembly for monitoring the torsion of a rotary shaft on an aircraft turbomachine, the assembly comprising:

at least three sensors for measuring a parameter dependent on the rotation of the shaft, said sensors being distributed along the rotary shaft to divide the shaft into at least two shaft segments, calculation means configured to calculate a parameter related to the torsion of the shaft for each achievable pair of sensors, comparison means configured to compare the different calculated parameters related to the torsion of the shaft with references, means for detecting damage on a shaft segment from the information transmitted by the comparison means, and means for indicating the localization of the damage on the shaft configured to indicate the damaged segment from the indication of the shaft segment for which damage has been detected by the detection means.

According to a first aspect of the assembly for monitoring the torsion of a rotary shaft, one of the sensors used to localize the damage can be a modular, autonomous and removable sensor.

According to a second aspect of the assembly for monitoring the torsion of a rotary shaft, each sensor is chosen among the magnetic sensors, the acoustic sensors, the capacitive sensors and the optical sensors.

In another object of the invention, there is proposed a turbomachine configured to receive an assembly for monitoring the torsion of a rotary shaft as defined above, the turbomachine comprising a housing and a hatch for accessing said housing for each sensor.

According to a first aspect of the turbomachine, at least one of the sensors can be a sensor permanently mounted on the turbomachine.

Another object of the invention proposes an aircraft comprising at least one turbomachine as defined above.

BRIEF DESCRIPTION OF THE DRAWINGS

FIG. 1 presents a flowchart of a method for monitoring the torsion of a rotary shaft of an aircraft turbomachine according to one implementation of the invention.

FIG. 2 illustrates one example of segmentation of the monitoring of a rotary shaft according to one embodiment of the invention.

FIG. 3 schematically represents one example of a sensor intended to be temporarily installed on a turbomachine to carry out a monitoring of the torsion as well as another function.

FIG. 4 schematically illustrates a turbomachine according to one embodiment of the invention on which a turbomachine 10 according to one embodiment of the invention is schematically illustrated, on which permanent sensors and a modular and autonomous assembly for detecting the angular position of the blades of an impeller in FIG. 3 are mounted.

FIG. 5 schematically illustrates a damage detection assembly for blades of a bladed wheel of an aircraft turbomachine having a first configuration.

FIG. 6 schematically illustrates a damage detection assembly for blades of a bladed wheel of an aircraft turbomachine having a second configuration.

FIG. 7 presents a flowchart of a method for detecting the angular position of the blades of a turbomachine impeller.

FIG. 8 presents a flowchart of a method for detecting damage to one or several blades constituting an impeller of an aircraft engine, the method comprising a detection of the angular position of the blades of an impeller according to one implementation of the invention.

DESCRIPTION OF THE EMBODIMENTS

The invention generally applies in the context of predictive maintenance services carried out by an aircraft engine manufacturer.

FIG. 1 illustrates a flowchart of a method for monitoring the torsion of a rotary shaft of an aircraft turbomachine according to one implementation of the invention.

The monitoring method comprises a first step 100 in which each sensor measures a parameter dependent on the rotation of the shaft.

In a following step 110, pairs of measurements are constituted, each measurement being coupled with the measurements from the other sensors, and a parameter related to the torsion of the shaft is calculated for each pair. For N sensors, it will thus be possible to form a number equal to N(N−1)/2.

In a following step 120, the different parameters related to the torsion of the shaft calculated in step 110 are compared with corresponding references.

In a following step 130, it is detected whether there is damage on a shaft segment based on the results of the comparison step 120.

Finally, if a segment is detected as damaged, the localization of the damage on the shaft from the shaft segment for which damage was detected in step 130 is indicated in a following step 140.

FIG. 2 illustrates one example of segmentation of the monitoring of a rotary shaft 19 from a first sensor mounted facing a first end of the shaft 19, from a second sensor 73 mounted between the two ends of the shaft 19, and from a third sensor 75 mounted facing the second end of the shaft 19. The three sensors 71, 73, and 75 are coupled to a main case 80 configured to perform the calculations of the method.

The three sensors 71, 73, 75 form three segments. A first segment A extending between the first sensor 71 and the second sensor 73, a second segment B extending between the second sensor 73 and the third sensor 75, and a third segment C extending between the first sensor 71 and the third sensor 75. The third segment C therefore has a length equal to the sum of the first and second segments A and B. The addition of a sensor compared to a configuration with two sensors thus allows going from a single torque measurement to three torque measurements.

Advantageously, the comparison of the three measurements with references allows identifying the most drifting (static or dynamic) segment compared to what is expected and therefore orienting the inspections in this direction. This is the localization of the damage (E): the drift is concentrated on the first segment A and no longer on the large segment C.

The segments are determined by the number of available sensors, such as the number of sensors available for performing a measurement of the angular position of an element of the shaft (comparison of the times of passage of a particular element). The positioning of the sensors to perform the discretization of the shaft is consistent with the variation in the shape and/or in the Young's modulus according to the design and manufacture of the shafts in the nominal state.

The method adapts to different turbomachine architectures, which allows carrying out a monitoring of the torsion of the shaft while minimizing the impact of integration on the turbomachine.

In one configuration, it is possible to use only sensor data from a first set of sensors permanently installed on the turbomachine for other missions. In another configuration, it is possible to use in addition to data derived from the first set of sensors, sensor data from a second set of sensors temporarily installed to carry out the torsion monitoring and/or other missions.

FIG. 3 schematically represents one example of a sensor intended to be temporarily installed on a turbomachine to carry out a monitoring of the torsion as well as another function.

The sensor is in the form of a modular and autonomous assembly 1 for detecting the angular position of the blades of an impeller, the detection assembly 1 being intended to be mounted on a turbomachine 10. The assembly 1 therefore has the primary function of detecting the angular position of the blades of an impeller, and is further used to carry out a monitoring of the torsion of the shaft of the turbomachine.

In the embodiment illustrated in FIG. 3, the modular and autonomous detection assembly or kit 1 comprises a main case 711, a first sensor 71, which can be identical to the first sensor 71 of FIG. 2, and a second sensor 72. Alternatively, the assembly could comprise more than two sensors.

The main case 711, which can be confused with the main case 80 of FIG. 2, comprises a communication unit 711a, a main power battery 711b, a storage unit 711c, two reversible manual fastening clips 711d and a main processing unit 711e.

Part of the storage unit 711c is a random access memory of the RAM type dedicated to the calculation and another part of the storage unit 711c is a read only memory of the NVRAM type for the storage of the results and the configuration parameters of the main processing unit 711e such as a processor.

The reversible manual fastening clips allow fastening the main case 711 on a turbomachine 10 without using a tool and in an easily removable manner. The fastening clips 711d are multipoint physical fasteners for mechanical connection to a turbomachine 10.

Each sensor 71 and 72 comprises a detection module, denoted respectively 71a and 72a, such as a Tip-timing sensor of the capacitive, optical, inductive, or pressure type, for example, a local battery, denoted respectively 71b and 72b, a communication module, denoted respectively 71c and 72c, allowing to communicate with the communication unit 711a of the main case 71, two reversible manual fastening clips, denoted respectively 71d and 72d, and a local processing unit, denoted respectively 71e and 72e, such as a processor.

The reversible manual fastening clips 71d or 72d allow fastening the sensor 71 or 72 on a turbomachine 10 without using a tool and in an easily removable manner. The fastening clips 71d or 72d are multipoint physical fasteners for mechanical connection to a turbomachine 10.

The information picked up by the detection module 71a or 72a of the sensor 71 or 72 is delivered to the local processing unit 71e or 72e which prepares the signal before its emission by the communication module 71c or 72c towards the communication unit 711a of the main case 711. The local processor 71e or 72e is capable of transforming the raw information acquired at several tens of kHz coming from the detection module 71a or 72a into a transmissible signal (digitization, compression, preprocessing, blade passage detection).

In the embodiment illustrated in FIG. 3, the communication module 71c or 72c of the sensors 71 and 72 is suitable for transmitting and receiving wireless information, and the communication unit 711a of the main case 711 is configured and adapted to receive the information transmitted via a wireless communication network.

Alternatively, the detection assembly 1 can comprise a single power source, such as a battery, localized in the main case 711 and supplying the sensors 71 and 72 with electrical energy via a wired connection.

FIG. 4 schematically illustrates a turbomachine 10 according to one embodiment of the invention on which permanent sensors and a modular and autonomous assembly for detecting the angular position of the blades of an impeller of FIG. 3 are mounted.

In the embodiment illustrated in FIG. 4, a detection kit 1 comprising only a first sensor 71 and a second sensor 72 are mounted on a turbomachine 10. The first sensor 71 is mounted on the nacelle of the turbomachine 10 facing the fan 11 to allow it to carry out a monitoring of the health of the blading of the fan 11. The second sensor 72 is mounted on the nacelle of the turbomachine 10 facing the blading 12 of the stage of the low-pressure compressor. The main case 711 is for its part mounted on the casing of the fan of the turbomachine 10 on a low-temperature area.

The first sensor 71 and the second sensor 72 are installed on the turbomachine in housings 70 provided for this purpose and equipped with an access hatch from the nacelle that allows easily opening and closing access to the housings to mount or dismount the sensors 71 and 72.

The main case 711 can also be housed in a location provided for this purpose with a dedicated access hatch. The access hatch can also be put in common with a housing dedicated to receiving another element of the turbomachine, such as an oil access hatch.

In the embodiment illustrated in FIG. 4, the turbomachine 10 comprises three other locations 70 provided to receive sensors similar to the first and second sensors 71 and 72 or other sensors, these housings may be for removable sensors or for sensors intended to remain permanent on the turbomachine 10.

The first and the second of the three other locations 70, which are free in FIG. 4, are localized at the rear of the turbomachine 10, for one, facing the stage 13 of the low-pressure turbine and, for the other, facing the stage 22 of the high-pressure turbine. The third of the three other free locations 70 is localized on the nacelle of turbomachine 10 facing the stage 21 of the high-pressure compressor.

Thanks to these locations 70, it would be possible, in another configuration, to have two other sensors positioned to monitor the stage 21 of the high-pressure compressor and the stage 22 of the high-pressure turbine which are coupled by the transmission shaft 19.

In a configuration where the turbomachine would comprise a reduction gear between the fan 11 and the low-pressure compressor 12, and/or a reduction gear between the high-pressure turbine 22 and the low-pressure turbine 13, the turbomachine could also comprise locations 70 to receive sensors at the reduction gears.

FIG. 5 schematically illustrates an assembly 20 for detecting damage for blades of a bladed wheel 11, or impeller, of an aircraft turbomachine 10 having a first configuration.

The assembly 20 for detecting damage comprises the kit 1 for detecting the position of the blades of an impeller in FIG. 5 and alert means 9.

To improve the readability of FIG. 5, all the elements of the kit 1 have not been represented. The kit 1 does indeed comprise all the elements described in FIG. 3, namely, a main case 711 including in particular the main processing unit 711e and a storage unit 711c in the form of one or several databases D1, D2, a first sensor 71 and a second sensor 72.

In addition to being used for the detection of the revolution counter, the first sensor 71 and the second sensor 72 of the assembly 1 for detecting the position of the blades also form data acquisition means 7 of the damage detection assembly 20.

When the blade position detection kit 1 is integrated into a damage detection assembly 20, the main processing unit 711e comprises additional means for detecting damage. The main processing unit is thus configured to execute a computer program comprising code instructions designed to implement an acquisition, signal processing, analysis, and alert algorithm according to the damage detection method of the invention.

The acquisition means 7 are configured to acquire a time signal Si relating to blades 111 to 115 of a bladed wheel 11, for example the bladed wheel of the fan or any other bladed wheel of the engine 10.

Advantageously, the acquisition means 7 use a tip-timing technique for measuring the times/instants of passage TOA (Time Of Arrival) of the blades 111 to 115.

As indicated in FIG. 4, the first sensor 71 of the acquisition means 7, which is a tip-timing sensor, is installed on the casing of the engine 10 in line with the bladed wheel 11 of the fan so as to acquire a time signal S₁ specific to the first sensor 71.

More particularly, a tip-timing sensor 71 detects and counts the passages of the tips of the blades 111 to 115 relative to a time base. Thus, a tip-timing sensor 71 can measure the time of current passage between the blades 111 to 115 relative to a reference point, also called "revolution counter". For a tip-timing sensor 71, the times of passage (TOA) specific to each blade 111 to 115 can then be deduced from the data measured by the main processing unit 711e, here via a calculation module 713 is internal to the main processing unit 711e.

In other words, a tip-timing sensor 71 allows acquiring measurements relating to the times/instants of passage of the tip of each blade 111 to 115 in line with a reference area of the bladed wheel 11. Furthermore, in the case where several sensors 71 are used on the same impeller, it is possible, in order to limit the risks of loss of the tip-timing sensors 71, to position the sensors 71 so as to maximize their azimuthal distance, in order to keep them as far away from each other as possible. Thus, in case of local failure of a sensor 71 (e.g.: impact of debris on a blade 111, fouling of a sensor 71) the risk of all the sensors 71 being affected is minimized.

In normal operation, the blades 111 to 115 will pass in front of the same tip-timing sensor 71 in a regular manner. At a given rpm, a time interval Δt between the passage of two consecutive blades will therefore be measured for a sensor 71.

Conversely, the alteration of the state of a blade, due for example to wear or to the ingestion of a foreign body FOD (Foreign Object Damage), can result in a change of the position of the blade when the latter passes in front of at least one of the sensors 71.

In order to be able to identify each blade 111 to 115, independently of their state, the main processing unit 711e is configured to analyze the different time signals S₁ relative to an angular reference.

The angular reference is provided, in this embodiment, by the kit 1 for detecting a "revolution counter" of FIG. 5, which in particular avoids using a phonic wheel.

The "revolution counter" detection assembly 1 is configured to detect the relative angular position of the blades of a first impeller, such as the impeller 11 of the fan whose damage to the blades is monitored using the first sensor 71, and a second impeller 12, the first and the second impellers 11 and 12 being traversed by the same air stream and, in the embodiment illustrated in FIG. 5, driven by the same shaft 19 of the turbomachine 10.

The damage to the blades of the second impeller 12 can also be monitored in the same way as for the first impeller 11 using other tip-timing sensors mounted facing the second impeller 12, such as the second sensor 72.

The first impeller 11 comprises a first number of blades N₁ and the second impeller 12 comprises a second number of blades N₂, the first number of blades N₁ of the first impeller 11 and the second number of blades N₂ of the second impeller 12 being distinct and having no common divider. The first and the second number of blades N₁ and N₂ are therefore mutually prime. The blades are evenly distributed over each of the impellers 11 and 12. Thus, on the same impeller 11 or 12, two adjacent blades are separated by the same angular interval.

The first and second sensors 71 and 72 are time-synchronized on the same clock and are configured to generate a signal upon each passage of a blade of the first or second impeller 11 or 12 in front of the corresponding sensor 71 or 72.

The main processing unit 711e of the detection kit 1 is configured to determine the time interval separating the detection of a blade of the first impeller 11 with the detection of each of the blades of the second impeller 12.

The first embedded sensor 71 returns a first time signal Si each time a blade of the first impeller 11 passes in front of it. The second embedded sensor 72 returns a second time signal S2 each time a blade of the second impeller 12 passes in front of it. The time interval between each detection, ΔT1 for the first impeller 11 and ΔT2 for the second impeller 12, depends on the rotational speed of the shaft 19 and on the respective number of blades on the impeller 11 or 12.

FIG. 6 schematically illustrates an assembly 20 for detecting damage for blades of an impeller 11 of an aircraft turbomachine 10 having a second configuration.

The second configuration of the turbomachine 10 illustrated in FIG. 6 differs from the first configuration of the turbomachine 10 illustrated in FIG. 5 in that the first and second impellers 11 and 12 are each traversed by an air stream which may not be the same and are driven by two distinct shafts 190 and 195 connected to each other by a reduction gear 198.

FIG. 7 is presents a flowchart of a method for detecting the angular position of the blades of an impeller of a turbomachine according to one implementation of the invention. The revolution counter detection assembly 1 can implement this method to detect the revolution counter.

The method comprises a first step 200 in which the first sensor 71 detects the passage of each blade 111 to 115 of the first impeller 11.

At the same time, in a second step 210, the second sensor 72 detects the passage of each blade 121 to 127 of the second impeller 12.

A disc measures 2π radians. Also, by making the link with the rotational speed of the shaft, 1 revolution/min=2π/60 rad.s⁻¹ is obtained.

For a fixed rotational speed, denoted RPM below, the time interval separating the passage of two successive blades of the same impeller having a number N of blades in front of a sensor associated with the impeller is determined by the following equation:

$$\Delta t = \frac{60}{2\pi * RPM} * \frac{1}{N} \qquad \text{[Math. 1]}$$

For the first impeller 11 and the first sensor 71 dedicated with its regard:

$$\Delta t_1 = \frac{60}{2\pi * RPM} * \frac{1}{N_1} \qquad \text{[Math. 2]}$$

is therefore obtained.

And for the second impeller 12 and the second sensor 72 dedicated with its regard:

$$\Delta t_2 = \frac{60}{2\pi * RPM} * \frac{1}{N_2} \qquad \text{[Math. 3]}$$

is therefore obtained.

The first and second sensors will therefore not have the same number of detections of blade passage in the same shaft revolution.

In the embodiments illustrated in FIGS. 3 and 4, the first impeller 11 comprises five blades, namely $N_1=5$, referenced 111 to 115, and the second impeller 12 comprises 7 blades, namely $N_2=7$, referenced 121 to 127. To facilitate the calculations, a speed of the shaft equal to $60/2\pi$ revolutions per minute, namely RPM=$60/2\pi$ rpm, is considered.

With these characteristics and considering that the sensors have the same angular position for simplicity, the record of the times of passages of the following blades at the end of the first step 200 and of the second step 210 is obtained:

TABLE 1

| First sensor 71 | Second sensor 72 |
|---|---|
| 0.100 | 0.050 |
| 0.300 | 0.192 |
| 0.500 | 0.335 |
| 0.700 | 0.478 |
| 0.900 | 0.621 |
| 1.100 | 0.764 |
| 1.300 | 0.907 |

It is important to note that the blades are not necessarily initially facing the sensor, which introduces a time limit before the first detection.

In a third step 220, the main processing unit 711e calculates the time interval Δt separating the passage of a blade of the first blade 11 from each of the blades 121 to 127 of the second impeller 12.

If, in the first embodiment illustrated in FIG. 5 where the two impellers 11 and 12 are driven by the same shaft 19, the time of arrival of the blades 111 to 115 of the first impeller 11 is compared with the time of arrival of the blades 121 to 127 of the second impeller 12, this matrix is obtained:

TABLE 2

| ΔT | 111 | 112 | 113 | 114 | 115 |
|---|---|---|---|---|---|
| 121 (revolution 1) | 0.05 | 0.25 | 0.45 | 0.65 | 0.85 |
| 122 | −0.092 | 0.107 | 0.307 | 0.507 | 0.707 |
| 123 | −0.235 | −0.035 | 0.164 | 0.364 | 0.564 |
| 124 | −0.378 | −0.178 | 0.021 | 0.221 | 0.421 |
| 125 | −0.521 | −0.321 | −0.121 | 0.078 | 0.278 |
| 126 | −0.664 | −0.464 | −0.264 | −0.064 | 0.135 |
| 127 | −0.807 | −0.607 | −0.407 | −0.207 | −0.007 |
| 121 (revolution 2) | 0.05 | 0.25 | 0.45 | 0.65 | 0.85 |

The values of the matrix correspond to the difference between the time of arrival of the blades 111 to 115 of the first impeller 11 with the time of arrival of the blades 121 to 127 of the second impeller 12, that is to say at the time intervals denoted ΔT.

Alternatively, the calculation of the time interval ΔT can take into account the reduction coefficient of the reduction device 198, if present.

For example, in the second embodiment illustrated in FIG. 6, the two impellers 11 and 12 are not located on the same shaft but are driven by two distinct shafts 190 and 195 coupled together via a $C_{reduction\ gear}$ factor reduction device 198. For the first impeller 11 and the first sensor 71 dedicated with its regard:

$$\Delta t_1 = \frac{60}{2\pi * C_{reduction\ gear} * RPM} * \frac{1}{N_1} \quad [\text{Math. 4}]$$

is therefore obtained.

And for the second impeller 12 and the second sensor 72 dedicated with its regard:

$$\Delta t_2 = \frac{60}{2\pi * RPM} * \frac{1}{N_2} \quad [\text{Math. 5}]$$

is therefore obtained.

If a similar comparison is made in the second embodiment, but this time by calculating the difference between a first time corresponding to the product between the factor $C_{reduction\ gear}$ and the time of arrival of the blades 111 to 115 of the first impeller 11 and a second time corresponding to the time of arrival of the blades 121 to 127 of the second impeller 12, the same matrix as indicated in the table referred to as Table 2 is obtained.

The matrix table thus offers as many angular references as desired. As indicated in the matrix table, the blades from one impeller to the other are not necessarily aligned either. If two impellers are aligned so as one blade of each aligned impeller is aligned with the other, we would have a cell in the table for which the difference would be zero.

Such a database can then be operated by an algorithm.

Alternatively, the calculation of the time interval ΔT can be standardized relative to the rotational speed of the shaft 19 driving the two impellers 11 and 12 so that the calculation is independent of the rotational speed.

Then, in a fourth step 230, the main processing unit 711e determines the relative angular position of each blade 111 to 115 of the first blade 11 relative to the angular position of the blades 121 to 127 of the second impeller 12 from the values of the intervals ΔT and to the value of the rpm of the first and second impellers 11 and 12.

In the example illustrated in FIGS. 1 and 2 and the tables above, it is the last two blades 115 and 127 to be detected for the end of a revolution that have the smallest time deviation Δt. But this result remains random because it is related to the shift offset of the first detection. The offset difference between the two impellers 11 and 12 will be related for its part to the mounting of the first and second impellers 11 and 12 on the shaft 19, and to the angular position of the first and second sensors 71 and 72. This offset therefore falls within the production and assembly of the turbomachine 10.

With an alignment of the first and second sensors 71 and 72 at the same angular reference, the offset is only related to the assembly of the impellers 11 and 12 on the shaft 19 and to their relative alignment.

This offset is characteristic of the turbomachine 10, and the resulting alignment between the blades from one impeller to the other is inherent to the turbomachine 10. This alignment, here is presented in relation to the time of passage of the blades with regard to a Tip Timing sensor, which is ultimately the time signature of this alignment of the blades.

Finally, in a fifth step 240, the main processing unit 711e designates as angular reference, that is to say as revolution counter, the blade of the first impeller 11 having the smallest time deviation Δt with a blade of the second impeller 12.

As mentioned above, the fifth blade 115 of the first impeller 11 and the seventh blade 127 of the second impeller 12 are the most aligned blades.

This particularity of alignment allows deciding arbitrarily that the fifth blade 115 of the first impeller 11 will be considered as the revolution counter, that is to say as the angular reference. Another blade of the first impeller 11 could have been arbitrarily designated as the revolution counter based on the analysis of the matrix table above.

The alignment of the blades from one impeller to the other remains the identical, because it is related to the assembly, and to the number of respective blades of the impellers. The identification of the revolution counter requires only one revolution to be identified by the deployed algorithm.

Thus, on each flight of the aircraft comprising a turbomachine 10, the first revolution of the engine 10 allows reconstituting the revolution counter. Then each detection of the blade chosen as revolution counter will give the time reference within the meaning of the tip-timing, and the angular reference within the meaning of the revolution counter.

The blade damage detection system 20 seeks to detect a lasting degradation of the performances of one or several blades 111 to 115 related to damage, and not a simple temporary disturbance observable on the signal S1. Thus, the angular reference (revolution counter T12) described above is only used to identify each of the blades 111 to 115 relative to the other ones. The detection of damage to a blade, which will be described later, therefore does not consist here of the simple observation or detection of the variation in the interval Δt between the pulses measured between the blades 111 by each tip-timing sensor 71.

At least one tip-timing sensor 71 can be used to measure the rpm of the engine 10 of the aircraft.

Each tip-timing sensor 71 can be of the capacitive, inductive, eddy current type, or an optical probe, these different types of sensors being robust, accurate and not bulky.

One exemplary implementation of a method for detecting damage to one or several blades 111 constituting the bladed wheel implemented by the damage detection assembly 20 is now described.

As illustrated in FIG. 8, this method comprises a step E1 of measuring the rpm of the engine 10 carried out by the acquisition means 7. As explained above, the measurement of the rpm of the engine 10 can be carried out by a tip-timing sensor 71.

At the same time, the tip-timing sensor 71 or 72 of an impeller 11 or 12 performs measurements relating to the times/instants of passage of the tip of each blade in line with the sensor. The processing means 11 then perform a conditioning of the measurements derived from the tip-timing sensor 71 or 72. This conditioning consists in identifying in real time each blade in the time signal measured using an angular reference, extracting from the temporary signal the time of passage (TOA) relating to an identified blade, associating with the identified blade its extracted time of passage as well as information relating to its revolution number (step E2).

For each acquisition of a time of passage (TOA) of a blade, the main processing unit 711e calculates, via the calculation module 713, a deflection at the tip of this blade (step E3), that is to say the spatial deviation of the tip of the blade 111 relative to a theoretical position of the latter at rest.

Then, during a step E4, the main processing unit 711e extracts, via an extraction module 712 illustrated in FIG. 5, the dynamic component for each calculated deflection, that is to say isolates it from the static component. The extraction of the dynamic component is carried out using isolation methods known from the state of the art (ex: the average one or use of a high-pass filter to extract a high-frequency component).

The main processing unit 711e further carries out, via a selection module 714, a selection step S of one or several rpm ranges of the engine 10 for which all the blades of the bladed wheel 11 are assumed to be synchronous, that is to say, supposed to have the same vibration behavior for the same rpm range of the engine 10. The rpm ranges of the engine 10 are here pre-identified relative to a reference database, for example the database D1, as guaranteeing that all the blades have the same vibration behavior when they pass in line with the tip-timing sensor 71 or 72.

With a view to identifying any damage to one or several blades for each rpm range of the engine 10 selected during the selection step S, the processing means 11 further comprise a processing module 715 taking as inputs the dynamic components selected by the selection module 714.

The processing module 715 is configured to determine (step E5) any variation in the dynamic behavior of each blade, by determining a variation in the dynamic components of each blade, and by relating these variations to a referential database. The results of the determination step E5 are moreover added to the monitoring database, here the database D2. Thus, the determination step E5 can be seen as a step of analyzing the dynamic vibration behavior of each blade for each engine rpm range selected during the selection step S.

The main processing unit 711e then proceeds, via a comparator 716, to a comparison step E6 following the determination step E5. The comparison step E6 consists in comparing each detected variation in a dynamic component of the deflection of a blade 111, that is to say each variation in its dynamic behavior, with one or several thresholds prerecorded in the referential database D1.

During this step E6, each dynamic component variation, therefore dynamic behavior variation, detected for a blade 111 is in particular compared with a first variation threshold, which indirectly corresponds to a state of health of the blade. This first threshold is related to a second threshold which concerns the variation in the natural frequency of the blade 111, reaching this threshold corresponding to damage to the blade 111.

The first and second thresholds were determined and then recorded in the referential database D1 during an initial learning phase E9.

The detection of a variation in the dynamic component of the deflection of the blade 111, that is to say the variation in its dynamic behavior, is therefore here related to the indirect detection of a drift in the natural frequency of this blade 111, this drift beyond a predetermined threshold reflecting damage thereof.

Thus, if the variation in the dynamic component of the deflection/in the dynamic behavior of the blade 111 is greater than the first variation threshold, this means that the natural frequency of the blade 111 has itself a drift reflecting damage to the blade 111. Indeed, damage to the blade 111 leads to a drift in its natural frequency and therefore to a drift in the dynamic component of its deflection.

Consequently, when the comparator 716 detects that the variation in the dynamic component of the deflection/in the dynamic behavior of the blade 111 is greater than or equal to the first threshold, the blade 111 is identified (step E7) as damaged.

An alarm indicating damage to the blade 111 is then emitted (step E8) to the alert means 9 (via, for example, sound and/or display means). Similarly, messages to be sent or made available to maintenance can be triggered during the emission of the alarm.

The invention claimed is:

1. A method for monitoring a torsion of a rotary shaft on an aircraft turbomachine based on the measurements from at least three sensor, wherein the at least three sensors include a first sensor, a second sensor, and a third sensor distributed along the rotary shaft to divide the shaft into at least two shaft segments, the method comprising:
    a step of measuring, for each sensor, a parameter dependent on the rotation of the shaft,
    a step of calculating, for each achievable pair of sensors, a parameter related to the torsion of the shaft, wherein the achievable pair of sensors include the first sensor and the second sensor, the first sensor and the third sensor, and the second sensor and the third sensor,
    a step of comparing the different calculated parameters related to the torsion of the shaft with references,
    a step of detecting damage on a shaft segment at the end of the comparison step, and
    a step of indicating the localization of the damage on the shaft from the shaft segment for which damage has been detected.

2. The method for monitoring the torsion of a rotary shaft according to claim 1, wherein at least one of the sensors used to localize the damage is a sensor permanently mounted on the turbomachine.

3. The method for monitoring the torsion of a rotary shaft according to claim 1, comprising a preliminary step of installing at least one removable autonomous modular sensor, at least one of the sensors used to localize the damage being a modular, autonomous and removable sensor.

4. An assembly for monitoring a torsion of a rotary shaft on an aircraft turbomachine, the assembly comprising:
    at least three sensors, wherein the at least three sensors include a first sensor, a second sensor, and a third sensor for measuring a parameter dependent on the rotation of the shaft, said sensors being distributed along the rotary shaft to divide the shaft into at least two shaft segments,
    calculation means configured to calculate a parameter related to the torsion of the shaft for each achievable pair of sensors, wherein the achievable pair of sensors include the first sensor and the second sensor, the first sensor and the third sensor, and the second sensor and the third sensor,
    comparison means configured to compare the different calculated parameters related to the torsion of the shaft with references,
    means for detecting damage on a shaft segment from the information transmitted by the comparison means, and
    means for indicating the localization of the damage on the shaft configured to indicate the damaged segment from the indication of the shaft segment for which damage has been detected by the detection means.

5. The assembly for monitoring the torsion of a rotary shaft according to claim 4, wherein one of the at least three sensors used to localize the damage is a modular, autonomous and removable sensor.

6. The assembly for monitoring the torsion of a rotary shaft according to claim 4, wherein each sensor is chosen among magnetic sensors, acoustic sensors, capacitive sensors and optical sensors.

7. A turbomachine configured to receive an assembly for monitoring the torsion of a rotary shaft according to claim 4, the turbomachine comprising a housing and a hatch for accessing said housing for each sensor.

8. The turbomachine according to claim 7, wherein at least one of the sensors is a sensor permanently mounted on the turbomachine.

9. An aircraft comprising at least one turbomachine according to claim 7.

* * * * *